United States Patent
Arima (10) Patent No.: US 7,218,667 B2
(45) Date of Patent: May 15, 2007

(54) RADIO RECEPTION APPARATUS AND RADIO RECEPTION METHOD

(75) Inventor: Takenobu Arima, Yokosuka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 722 days.

(21) Appl. No.: 10/276,982

(22) PCT Filed: Mar. 28, 2002

(86) PCT No.: PCT/JP02/03036

§ 371 (c)(1),
(2), (4) Date: Nov. 21, 2002

(87) PCT Pub. No.: WO02/080394

PCT Pub. Date: Oct. 10, 2002

(65) Prior Publication Data

US 2004/0091021 A1    May 13, 2004

(30) Foreign Application Priority Data

Mar. 29, 2001  (JP)  .............................. 2001-95153

(51) Int. Cl.
H04B 1/00 (2006.01)
H04B 1/10 (2006.01)
H03K 9/00 (2006.01)
H04L 27/00 (2006.01)
H04L 25/08 (2006.01)

(52) U.S. Cl. .................... 375/148; 375/316; 375/346

(58) Field of Classification Search ................ 375/147, 375/148, 224, 316, 322, 346

See application file for complete search history.

(56) References Cited

U.S. PATENT DOCUMENTS 5,764,690 A  *  6/1998  Blanchard et al. .......... 375/147

(Continued)

FOREIGN PATENT DOCUMENTS

EP    0996247 A1    4/2000

(Continued)

OTHER PUBLICATIONS

Aturashi et al. "Iterative decision-directed path search and channel estimation for multi-carrier/DS-CDMA broadband packet wireless access" IEEE Vehicular Technology Conference Proceedings, vol. 1, May 15-18, 2000 pp. 420-424.*

(Continued)

*Primary Examiner*—David C. Payne
*Assistant Examiner*—Aslan Ettehadieh
(74) *Attorney, Agent, or Firm*—Stevens, Davis, Miller & Mosher, LLP (57) ABSTRACT

The PL signal of a PL portion is multiplied by gain factor $\beta c$ in a multiplier(109) and the data of a data portion is multiplied by gain factor $\beta d$ in a multiplier(110). These gain factors $\beta c$ and $\beta d$ are controlled in a weight controlling circuit (112). The PL signal and data thus multiplied by gain factors are added in an adder (111) and become an added PL signal. This added PL signal is output to a delay profile generation circuit (113). In the delay profile generation circuit (113), a delay profile is generated using the added PL signal. The delay profile is output to a path selection circuit (104) where path search is performed, and the information of selected reception timings are output to a RAKE combining circuit (105) and a channel estimation circuit (115). By this means, iterative path search and channel estimation can be performed with accuracy even when receiving signals where channels of different transmission power ratios are multiplexed.

15 Claims, 9 Drawing Sheets

U.S. PATENT DOCUMENTS

| | | | | |
|---|---|---|---|---|
| 6,480,523 | B1 * | 11/2002 | Kondo | 375/140 |
| 6,700,919 | B1 * | 3/2004 | Papasakellariou | 375/130 |
| 6,795,422 | B2 * | 9/2004 | Ohsuge | 370/342 |
| 6,898,197 | B1 * | 5/2005 | Lavean | 370/335 |
| 2001/0022808 | A1 * | 9/2001 | Komatsu | 375/148 |
| 2002/0034217 | A1 * | 3/2002 | Zhang | 375/147 |
| 2002/0122471 | A1 * | 9/2002 | Ling | 375/147 |

FOREIGN PATENT DOCUMENTS

| | | |
|---|---|---|
| EP | 1158708 A1 | 11/2001 |
| JP | 10233713 | 9/1998 |
| JP | 11122153 | 4/1999 |
| JP | 11220503 | 8/1999 |
| JP | 11274976 | 10/1999 |
| JP | 11313010 | 11/1999 |
| JP | 11341553 | 12/1999 |
| JP | 11346205 | 12/1999 |
| JP | 11355849 | 12/1999 |
| JP | 2000151465 | 5/2000 |
| JP | 2000174664 | 6/2000 |
| JP | 2000196559 | 7/2000 |
| JP | 2000216756 | 8/2000 |
| JP | 2000341210 | 12/2000 |
| JP | 2001016134 | 1/2001 |
| JP | 2001044965 | 2/2001 |
| JP | 2002528999 | 9/2002 |

OTHER PUBLICATIONS

Supplementary European Search Report dated Jul. 24, 2003.

M. Nakamura, et al.; "A Study of Decision Feedback Channel Estimation For W-CDMA," IEICE Transactions on Electronics Institute of Electronics Information and Comm. Eng. Tokyo, JP, Sep. 7, 1998, pp. 309-311, XP002944136, ISBN: 0916-8524; partial English translation.

T. Ishi, et al.; "Repeatedly Updated Channel Estimation for DS-CDMA with D.F. and Extrapolation," IEICE Transactions on Electronics Institute of Electronics Information and Comm. Eng. Tokyo, JP, Mar. 6, 1997, pp. 413-415, XP002944135, ISBN: 0916-8524; partial English translation.

International Search Report dated Jul. 2, 2002.

H. Atarashi, et al.; "Iterative Decision-Directed Path Search and Channel Estimation for Multi-carrier/DS-CDMA Broadband Packet Wireless Access", Vehicular Technology Conference Proceedings, 2000, VTC2000-Spring Tokyo, 2000 IEEE 51st., May 2000, vol. 1, pp. 420-424.

H. Atarashi, et al.; "Iterative Decision-Directed Path Search and Channel Estimation Method for Multi-Carrier/DS-CDMA Broadband Packet Wireless Access", The Institute of Electronics, Information and Communication Engineers Gijutsu Kenkyu Hokoku, RCS2000-4, Apr. 21, 2000, pp. 19-26 with English Abstract.

S, Suwa, et al.; "Iterative Decision-Directed Path Search and Channel Estimation with Fast Fading Tracking Ability for MC/DC-CDMA Broadband Packet Wireless Access", The Institute of Electronics, Information and Communication Engineers, SSE2000-78, RCS2000-67, Jul. 2000, pp. 111-117 with English Abstract.

* cited by examiner

RADIO RECEPTION APPARATUS AND RADIO RECEPTION METHOD

TECHNICAL FIELD

The present invention relates to a radio reception apparatus and radio reception method for use in a digital wireless communication system.

BACKGROUND ART

In view of the spread and development of wireless internet connections, high-speed, large volume wireless communication has drawn attention over recent years. In order to implement this high-speed, large volume communication, the W-CDMA (Wideband-Code Division Multiple Access) scheme has come under attention, and under the conditions of multi-path fading, coherent RAKE combining reception holds great significance. In order to realize the above, highly accurate reception timing detection for every path (path search) and channel estimation are needed.

To meet these needs, iterative path search and channel estimation are being studied. Such iterative path search and channel estimation are disclosed in "Iterative Decision-Directed Path Search and Channel Estimation For Multi-Carrier/DS-CDMA Broadband Packet Wireless Access" by Atarashi, Abeta, Sawahashi, and Adachi, in Technical Report of IEICE, RCS2000-4 (2000-04). According to this technique, after performing the initial path search and channel estimation using only pilot symbols and performing RAKE combining and error correction decoding, the decision-directed data symbols after decoding are added to the pilot symbols and path search and channel estimation are recursively repeated. By this means, it is possible to improve reception performance.

However, by the above-mentioned iterative path search and channel estimation, cases might arise where performance improvement is little due to decoding errors from early stages of repetition. In addition, the above technique is based on the premise that known signals and data signals are time-multiplexed and the transmission power is even. Because of this, in case DPDCH (Dedicated Physical Data CHannel) and DPCCH (Dedicated Physical Control CHannel) are code-multiplexed and their normal transmission power rates vary such as uplink channel signals in W-CDMA, it is not possible to use them for accurate iterative path search and channel estimation, and consequently, little performance improvement can be expected.

SUMMARY OF THE INVENTION

An object of the present invention is to provide a radio reception apparatus and radio reception method that reduce the effect of bit errors from early stages of repetition and that enable accurate iterative path search and channel estimation even in case transmission power rates differ between known signals and data signals.

BEST MODE FOR CARRYING OUT THE INVENTION

The present inventor has discovered that when iterative path search and channel estimation using known signals and data are to be performed, it is effective to perform weighting and in-phase addition in order to minimize the effect of data decision errors and thus arrived at the present invention.

That is, the essence of the present invention is that weight is assigned to pseudo pilot signals made up of known signals and to data signals according to signal quality and in-phase addition is performed so that even where the quality of received signals is poor, the effect of data decision errors can be minimized and iterative path search and channel estimation can be performed with accuracy.

With reference to the accompanying drawings now, embodiments of the present invention will be described below.

Embodiment 1

A case will be described here with reference to the present embodiment where, in iterative path search and channel estimation, after uplink channel signals composed of IQ-multiplexed known signals and data are subjected to phase correction in such away as to synchronize the phase, the signals are assigned weight according to transmission power rates and then in-phase addition is performed.

Figure 1:
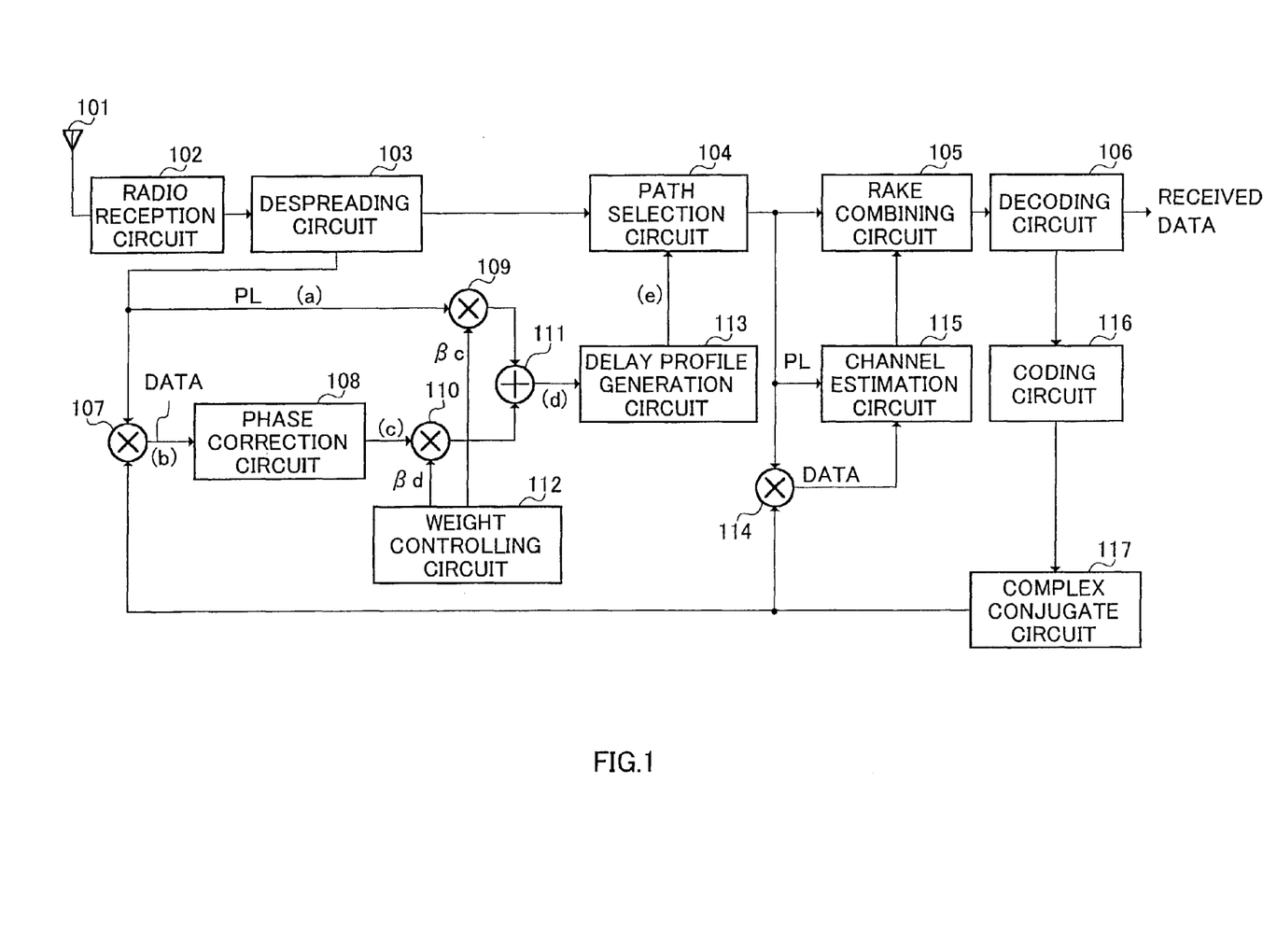
FIG. 1 is a block diagram showing a configuration of a wireless base station apparatus comprising a radio reception apparatus according to Embodiment 1 of the present invention.

FIG. 1 is a block diagram showing the configuration of a wireless base station apparatus comprising a radio reception apparatus according to Embodiment 1 of the present invention. The wireless base station apparatus in FIG. 1 shows the configuration of the receiver side alone; however, this wireless base station apparatus includes configuration of the transmitter side as well.

A uplink channel signal from a communication terminal is received in radio reception circuit 102 by way of antenna 101. In radio reception circuit 102, the uplink channel signal is subjected to predetermined radio reception processing (i.e., down-conversion and A/D conversion), and the signal after radio reception processing is output to despreading circuit 103.

In despreading circuit 103, the signal after radio reception processing is subjected to despreading processing using the spreading code used by the communication terminal and output to path selection circuit 104 while also output to multipliers 107 and 109. That is, the despread signal is output to path selection circuit 104 for path selection. In addition, the despread signal of the pilot (PL) portion (known signal) of DPCCH is output to multiplier 109 while the despread signal of the DPDCH (data) portion is output to multiplier 107.

In multiplier 107, the despread signal of the data portion is multiplied by a complex conjugate value of data in which decoded data is coded once again, and the result of multiplication is output to phase correction circuit 108 as a pseudo pilot signal. In phase correction circuit 108, the phase of the pseudo pilot signal is shifted by 90° and the shifted signal is output to multiplier 110.

In multiplier 110, the shifted signal is multiplied by gain factor $\beta d$. In actuality, maximum ratio combining takes place using $\beta d^2$. The pseudo pilot signal multiplied by gain factor $\beta d$ is output to adder 111. In multiplier 109, the despread signal (PL signal) of the PL portion is multiplied by gain factor $\beta c$. In actuality, maximum ratio combining takes place using $\beta c^2$. The PL signal multiplied by gain factor $\beta c$ is output to adder 111. Incidentally, gain factors $\beta c$ and $\beta d$ are controlled in weight controlling circuit 112.

In adder 111, the pseudo pilot signal output from multiplier 109 and the PL signal output from multiplier 110 are added, and the added PL signal after addition (that in which the pseudo pilot signal and PL signal are added) is output to delay profile generation circuit 113.

In delay profile generation circuit 113, a delay profile is generated using the added PL signal. This delay profile is output to path selection circuit 104. In path selection circuit 104, a given number of paths (reception timings) exceeding a given threshold level are selected. The despread signals of these selected reception timings are output to RAKE combining circuit 105. In RAKE combining circuit 105, channel estimation results output from channel estimation circuit 115 are used to RAKE-combine the selected paths, and the signal after combination is output to decoding circuit 106.

The despread signals of the reception timings selected in path selection circuit 104 are output also to channel estimation circuit 115. In multiplier 114, the despread signal of the data portion is multiplied by a complex conjugate value of data in which decoded data is coded once again, and the result of multiplication is output to channel estimation circuit 115 as a pseudo pilot signal. In channel estimation circuit 115, channel estimation is performed using the pseudo pilot signal and the PL signal, and this channel estimation result is output to RAKE combining circuit 105. In decoding circuit 106, the signal after RAKE combining is decoded and output as received data while also output to coding circuit 116. In coding circuit 116, the decoded data is recoded and then output to complex conjugate circuit 117. In complex conjugate circuit 117, complex conjugates of the recoded data are picked and output to multiplier 107 and multiplier 114.

Figure 2:
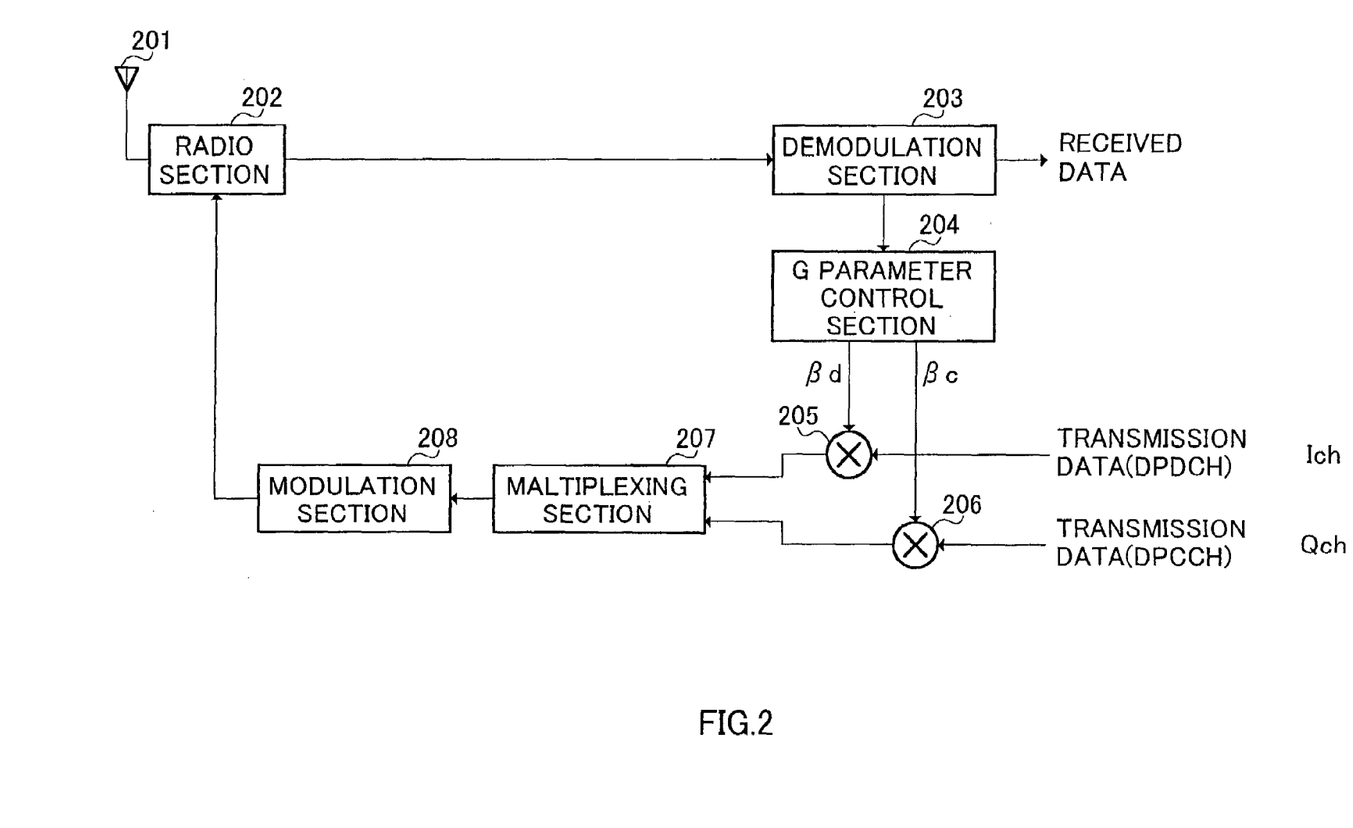
FIG. 2 is a block diagram showing a configuration of a communications terminal apparatus that performs wireless communication with a wireless base station apparatus comprising a radio reception apparatus of the present invention.

FIG. 2 is a block diagram showing the configuration of a communications terminal apparatus that performs wireless communication with a wireless base station apparatus comprising a radio reception apparatus of the present invention.

A downlink channel signal from a base station is received in radio section 202 by way of antenna 201. In radio section 202, the downlink channel signal is subjected to predetermined radio reception processing (e.g., down-conversion and A/D conversion), and the signal after radio reception processing is output to demodulation section 203. Demodulation section 203 performs processings such as despreading processing, synchronous detection, RAKE combining, channel codec, and separation.

The demodulated data demodulated in demodulation section 203 is obtained as received data while also output to G parameter controlling section 204. In G parameter controlling section 204, gain factors $\beta d$ and $\beta c$ corresponding to the G parameters from the base station are obtained, and transmission data is multiplied (weighted) by these gain factors $\beta d$ and $\beta c$. That is, transmission data of DPDCH (I ch) is output to multiplier 205 and there multiplied by gain factor $\beta d$ for DPDCH. The transmission data of DPCCH (Q ch) is output to multiplier 206 and there multiplied by gain factor $\beta c$ for DPCCH. In this way, DPDCH (I ch) and DPCCH (Q ch) are gain-adjusted.

Transmission data of DPDCH and DPCCH, each multiplied by $\beta d$ or $\beta c$, are multiplexed in multiplexing section 207 and thereafter output to modulation section 208. In modulation section 208, the multiplexed signal is subjected to digital modulation processing and despreading modulation processing and the signal after demodulation is output to radio section 202.

In radio section 202, the modulated signal is subjected to predetermined radio transmission processing (e.g., D/A conversion and up-conversion). The signal after this radio transmission processing is transmitted to a base station as a uplink channel signal by way of antenna 201.

Next, the operation of a radio reception having the above configuration will be described.

In communications terminals, transmission data is multiplied by gain factor. That is, transmission data of DPDCH (I ch) is multiplied by gain factor $\beta d$ for DPDCH, and transmission data of DPCCH (Q ch) is multiplied by gain factor $\beta c$ for DPCCH. These gain factors $\beta c$ and $\beta d$ are determined by G parameters contained in downlink channel signals. Therefore, uplink channel signals are gain-adjusted by gain factors $\beta c$ and $\beta d$ determined in base stations.

Then, the gain-adjusted transmission data of DPDCH and transmission data of DPCCH are IQ-multiplexed and transmitted to as a uplink channel signal to a base station.

In the base station, despreading processing is performed on the uplink channel signal, and the despread signal of the PL portion (PL portions of DPCCH) and the despread signal of the data portion (DPDCH) are obtained. At the initial path search and channel estimation, a delay profile is generated in delay profile generation circuit 113 using the despread signal of the PL portion, and based on this delay profile, a reception timing of path is selected in path selection circuit 104 (path search).

Channel estimation is performed in channel estimation circuit 115 using the PL signals of the selected reception timings, and using these channel estimation results, despread signals of data portions are RAKE-combined in the RAKE combining circuit. The signal after combination is decoded in decoding circuit 106 to obtain received data, and meanwhile this decoded data is subjected to recoding in coding circuit 116 and then output to complex conjugate circuit 117. In complex conjugate circuit 117, complex conjugates of coded data are output to multiplier 107 and multiplier 114 for iterative path search and channel estimation.

In multiplier 107, the despread signal of the data portion is multiplied by a complex conjugate of the recoded data, whereby a pseudo pilot signal is obtained. As described above, through multiplication by complex conjugates of data, the orthogonal modulation elements of recoded data are removed, m which makes possible the use of pseudo PL signals. Now, the process of obtaining added PL signals where the pseudo PL signal and PL signal are added will be described with reference to FIGS. 3A~E.

In a uplink channel signal, the PL portion (PL portion of DPCCH) and data portion (DPDCH) are code-multiplexed (IQ multiplexed). That is, the PL portion (PL portion of DPCCH) and data portion (DPDCH) are multiplexed in a state where they are subject to despreading modulation processing using different despreading codes. Because of this, the PL signal is mapped on the Q axis as in FIG. 3A and data (pseudo pilot signal) is mapped on the I axis as in FIG. 3B.

Figure 3A:
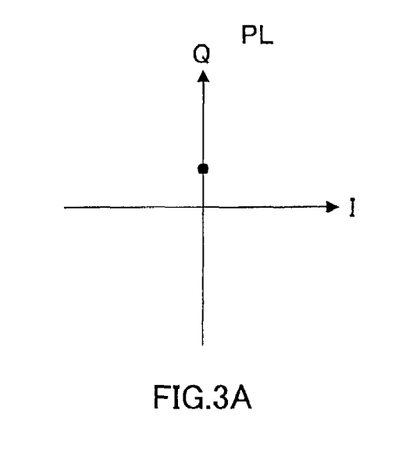
FIG. 3A shows a state of mapping of PL signal according to Embodiment 1 of the present invention.
Figure 3B:
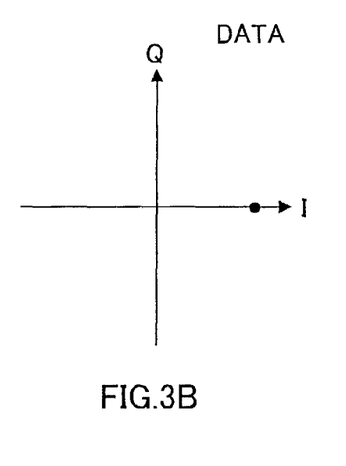
FIG. 3B shows a state of mapping of pseudo PL signal according to Embodiment 1 of the present invention.
Figure 3C:
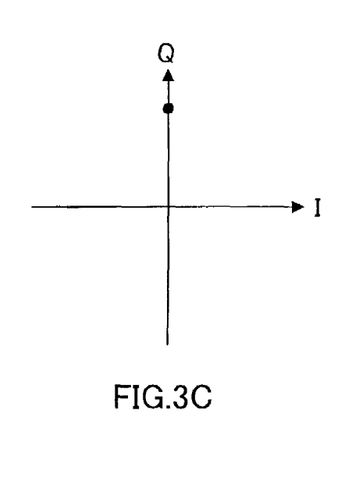
FIG. 3C shows a state where pseudo PL signal is phase-corrected through a phase correction circuit according to Embodiment 1 of the present invention.

As for the data (pseudo PL signal), the phase is shifted by 90° in phase correction circuit 108 and the data moves onto the Q axis as in FIG. 3C. Then the PL signal is multiplied by gain factor βc in multiplier 109, and in multiplier 110, the data (pseudo PL signal) is multiplied by gain factor βd. These gain factors βc and βd are controlled in weight controlling circuit 112.

Since gain factors are determined in base stations and informed to communication terminals as G parameters, in weight controlling circuit 112, gain factors are controlled based on G parameters informed to communication terminals. In such case, in weight controlling circuit 112, gain factors are controlled considering the energy for every 1 bit in the PL signal and pseudo PL signal.

Figure 3D:
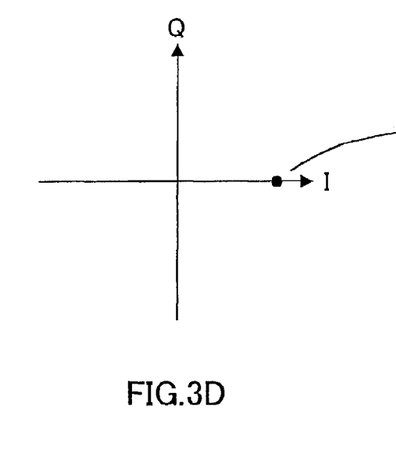
FIG. 3D shows a state of signal in which PL signal and pseudo PL signal according to Embodiment 1 of the present invention are added.
Figure 3E:
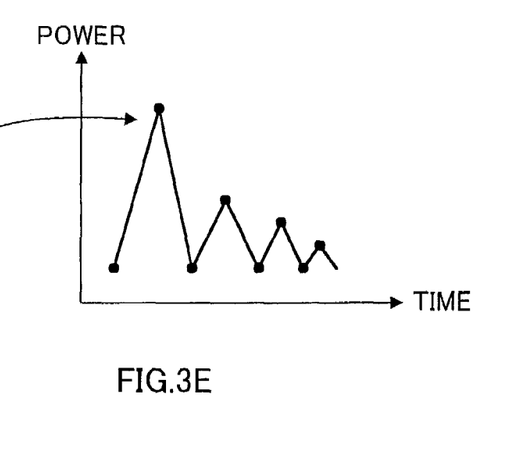
FIG. 3E describes delay profile generation according to Embodiment 1 of the present invention.

The PL signal and data (pseudo PL signal) multiplied m by gain factors are added in adder 111 and become an added PL signal as shown FIG. 3D. This added PL signal is output to delay profile generation circuit 113. In delay profile generation circuit 113, a delay profile is generated using the added PL signal.

The delay profile is output to path selection circuit 104, where path search takes place as described above, and the information corresponding to the selected reception timings are output to RAKE combining circuit 105 and channel estimation circuit 115.

Meanwhile, in multiplier 114, the despread signal of the data portion is multiplied by complex conjugates of the recoded data, whereby a pseudo PL signal is obtained. As described above, by multiplying complex conjugates of data, the orthogonal modulation elements of recoded data are removed, which makes possible the use of pseudo PL signals.

In channel estimation circuit 115, channel estimation is performed using the pseudo PL signal and PL signal, and this channel estimation result is output to RAKE combining circuit 105. Processings in RAKE combining circuit 105, decoding circuit 106, coding circuit 116, and in complex conjugate circuit 117 are as described above. Then, the complex conjugate data from complex conjugate circuit 117 is output again to multiplier 107 and multiplier 114. By thus performing iterative path search and channel estimation, the accuracy of path search and channel estimation is heightened to improve reception performance.

As thus described, according to the present embodiment, IQ-multiplexed (code-multiplexed) DPCCH signals and DPDCH signals of different transmission power rates are subject to phase rotation correction and then to in-phase addition, whereby the number of samples per time unit increases and delay profiles can be averaged in a shorter time period. Furthermore by thus subjecting DPCCH signals and DPDCH signals of different transmission power rates to in-phase addition (maximum ratio combining) after power adjustment, it is possible to improve the SN ratio (Signal to Noise Ratio) after in-phase addition and perform iterative path search with high accuracy.

Although a case was described above with the present embodiment where data (pseudo PL signal) is subjected to phase correction and thereafter multiplied by a gain factor, the present invention can be configured such that data (pseudo PL signal) is multiplied by a gain factor prior to phase correction.

Embodiment 2

A case will be described here with the present embodiment where DPCCH and DPDCH are assigned weight in accordance with the number of times iterative path search and channel estimation are repeated.

Figure 4:
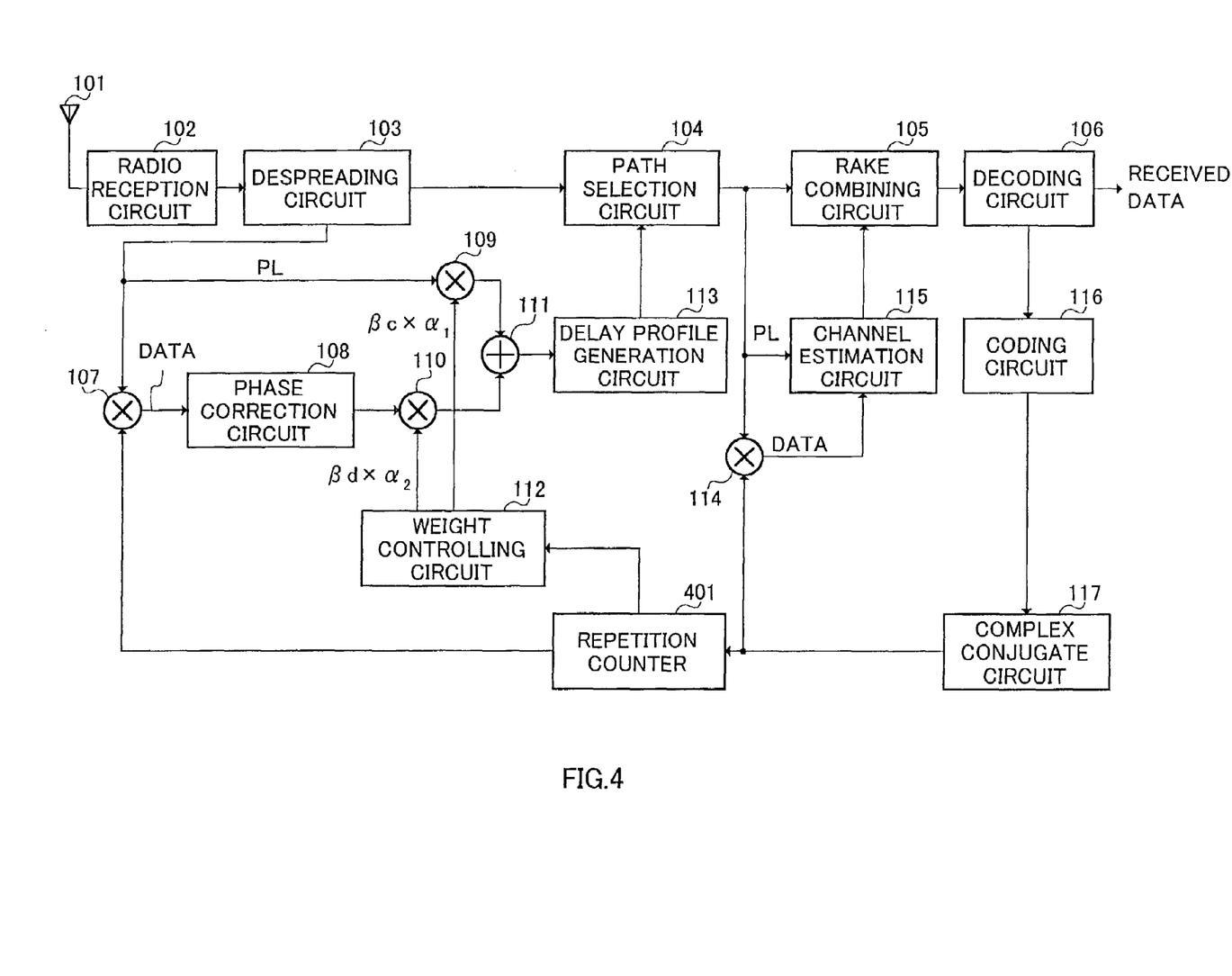
FIG. 4 is a block diagram showing a configuration of a wireless base station apparatus comprising a radio reception apparatus according to Embodiment 2 of the present invention.

FIG. 4 is a block diagram showing the configuration of a wireless base station apparatus comprising a radio reception apparatus according to Embodiment 2 of the present invention. Parts in FIG. 4 identical to those in above FIG. 1 are assigned the same codes as in FIG. 1 and their detailed explanations are omitted.

The wireless base station apparatus shown in FIG. 4 comprises repetition counter 401 that counts the number of times iterative path search and channel estimation take place. In repetition counter 401, the number of output times from complex conjugate circuit 117 is counted, and the information of the repetition times is output to weight controlling circuit 112.

As to controlling the number of repetition times, it is also possible to use CRC (Cyclic Redundancy Check) information and, provided that CRC is OK, stop the repetition and counting the number of repetition times.

In weight controlling circuit 112, based on the number of times iterative path search channel estimation take place, gain factors βc and βd are multiplied by a predetermined coefficient α1 and output to multiplier 109 and multiplier 110. That is, the PL signal is multiplied by βc×α1 in multiplier 109, and the pseudo PL signal is multiplied by βd×α2 in multiplier 110.

These α1 and α2 are set from time to time in accordance with the number of repetition times. For example, when the number of repetition times is small, based on the assumption that the reliability of the pseudo PL signal is low, the weight of βd is reduced while the weight of βc is increased. That is, in weight controlling circuit 112, α1 is made big and α2 is set small, and this α1 is multiplied by βc and output to multiplier 109, while α2 is multiplied by βd and output to multiplier 110.

On the other hand, when the number of repetitions is big, based on the assumption that the reliability of the pseudo PL signal is high, the weight of βd is made big while the weight of βc is made small. That is, in weight controlling circuit 112, α1 is made small and α2 is set big, and this α1 is multiplied by βc and output to multiplier 109, and α2 is multiplied by βd and output to multiplier 110.

By thus increasing the weight of the pseudo PL signal according to the number of repetition times, i.e., as the reliability of the pseudo PL signal becomes higher, iterative path search and channel estimation can be performed with high accuracy and the reception performance is enhanced.

Embodiment 3

A case will be described here with the present embodiment where DPCCH and DPDCH are assigned weight according to reception quality. A case will be described here where SIR (Signal to Interference Ratio) is used as reception quality; nevertheless, it is still possible to use other parameters than SIR as reception quality.

Figure 5:
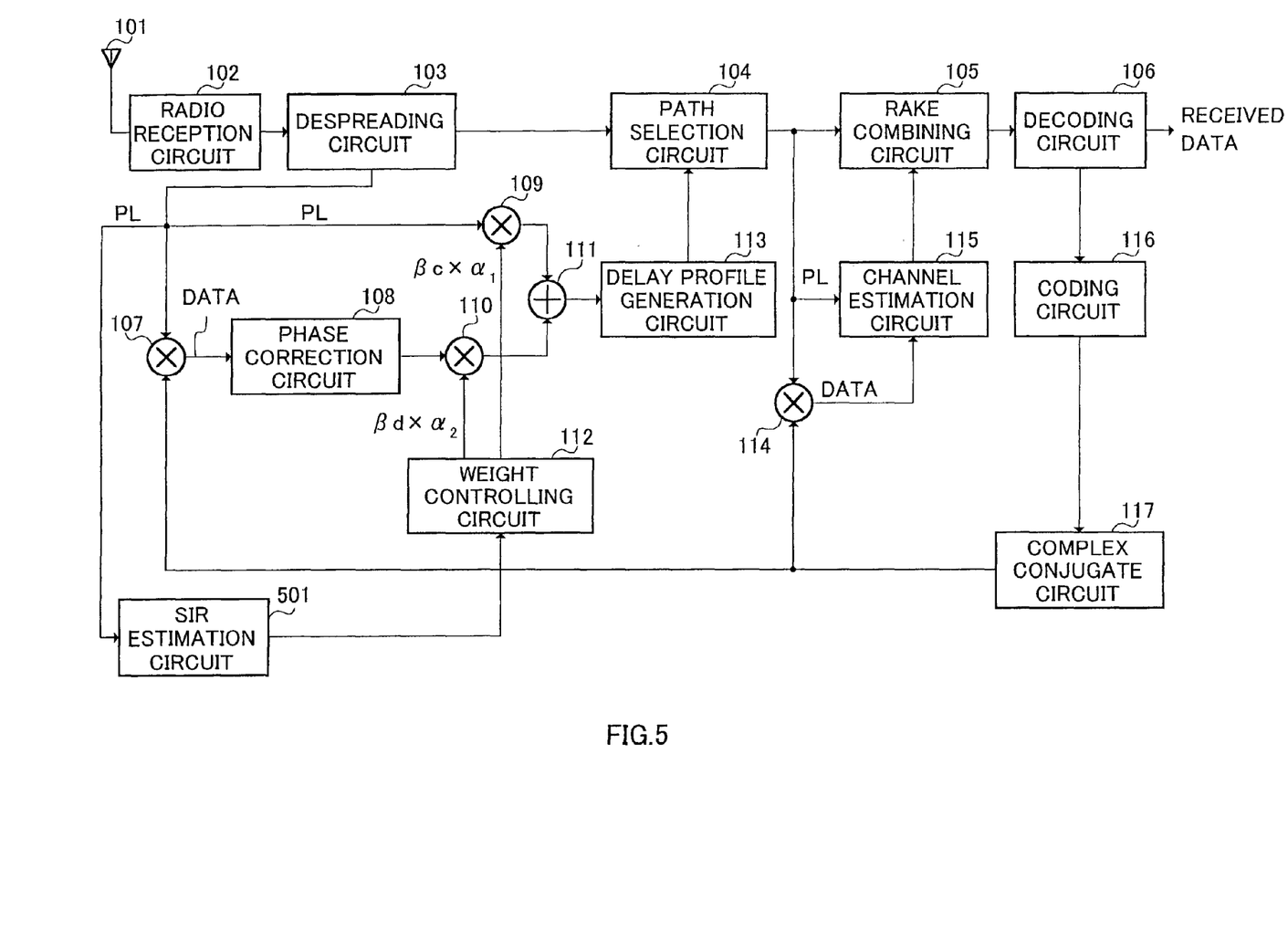
FIG. 5 is a block diagram showing a configuration of a wireless base station apparatus comprising a radio reception apparatus according to Embodiment 3 of the present invention.

FIG. 5 is a block diagram showing the configuration of a wireless base station apparatus comprising a radio reception apparatus according to Embodiment 1 of the present invention. Parts in FIG. 5 identical to those in above FIG. 1 are assigned the same codes as in FIG. 1 and their detailed explanations are omitted.

The wireless base station apparatus shown in FIG. 5 comprises SIR measurement circuit 501 that measures SIR, which is reception quality. In SIR measurement circuit 501, SIR is measured using the despread signal of the PL portion that is output from despreading circuit 103, and the measurement result is output to weight controlling circuit 112.

In weight controlling circuit 112, based on the SIR measurement result, gain factors βc and βd are multiplied by a predetermined coefficient al and output to multiplier 109 and to multiplier 110. That is, the PL signal is multiplied by βc×α1 in multiplier 109, and the pseudo PL signal is multiplied by βd×α2 in multiplier 110.

These α1 and α2 are changed and set from time to time in accordance with SIR measurement results. For example, when the SIR measurement result is poor, based on the assumption that the condition of transmission path is poor and that the reliability of the pseudo PL signal is low, the weight of βd is reduced while the weight of βc is increased. That is, in weight controlling circuit 112, α1 is made big and α2 is set small, and this α1 is multiplied by βc and output to multiplier 109, while α2 is multiplied by βd and output to multiplier 110.

On the other hand, when the SIR measurement result is good, based on the assumption that the condition of transmission path is good and that the reliability of the pseudo PL signal is high, the weight of βd is increased while the weight of βc is reduced. That is, in weight controlling circuit 112, α1 is made small and α2 is set big, and this α1 is multiplied by βc and output to multiplier 109, while α2 is multiplied by βd and output to multiplier 110.

As to whether SIR is good or poor, this can be determined by, for instance, applying threshold determination to SIR measurement results.

By thus increasing the weight of the pseudo PL signal according to reception quality, i.e., as the reliability of the pseudo PL signal becomes higher, iterative path search and channel estimation can be performed with high accuracy and the reception performance is enhanced.

Embodiment 4

A case will be described here with the present embodiment where a signal after RAKE combining is subjected to hard decision and a pseudo PL signal is generated using complex conjugates to perform iterative path search and channel estimation.

Figure 6:
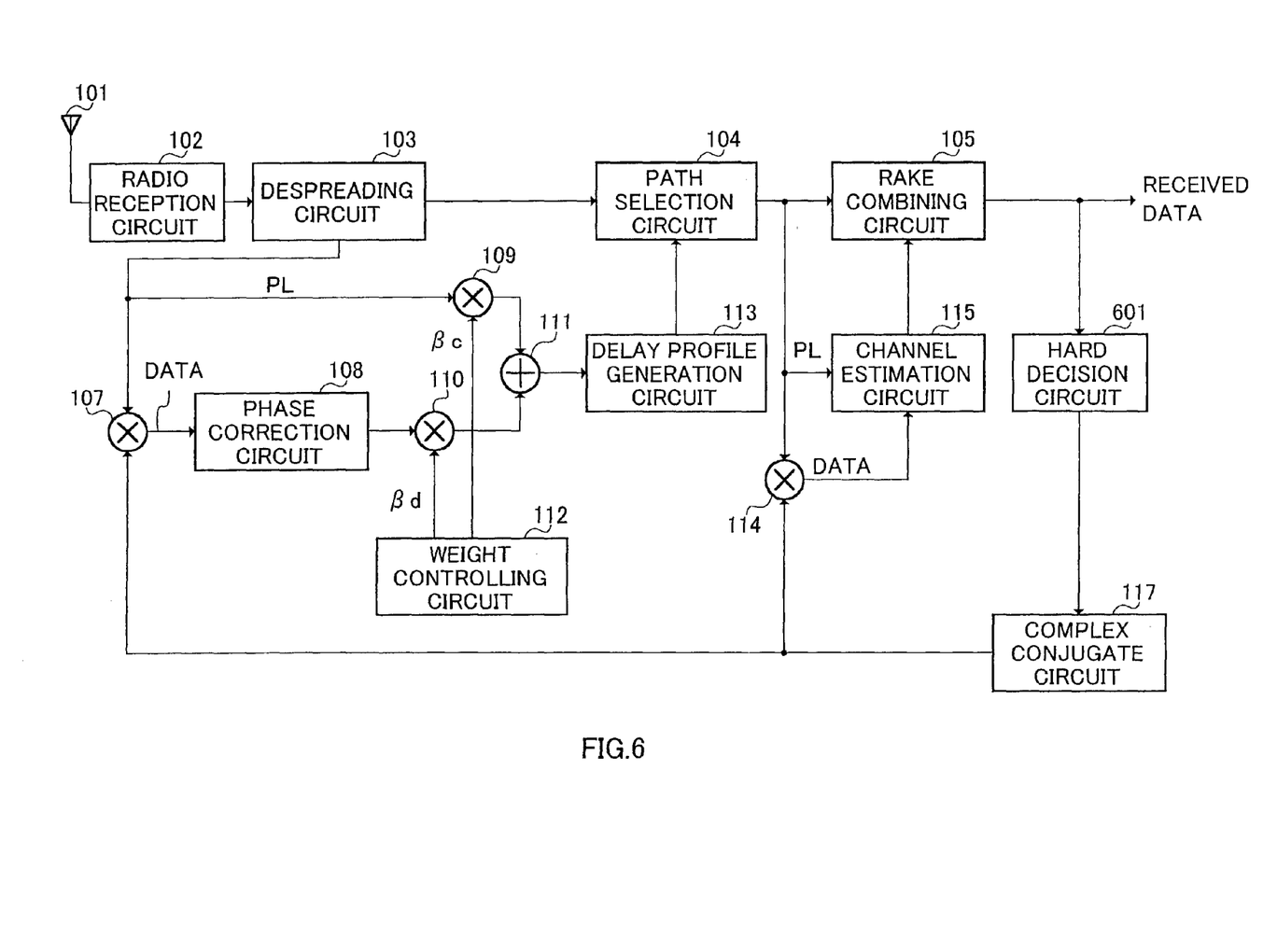
FIG. 6 is a block diagram showing a configuration of a wireless base station apparatus comprising a radio reception apparatus according to Embodiment 4 of the present invention.

FIG. 6 is a block diagram showing the configuration of a wireless base station apparatus comprising a radio reception apparatus according to Embodiment 4 of the present invention. Parts in FIG. 6 identical to those in above FIG. 1 are assigned the same codes as in FIG. 1 and their detailed explanations are omitted.

The wireless base station apparatus shown in FIG. 6 comprises hard decision circuit 601 that performs hard decision of the data that is RAKE-combined in RAKE combining circuit 105. In hard decision circuit 601, the data that is RAKE combined in RAKE combining circuit 105 is subjected to hard decision, and this hard decision data is output to complex conjugate circuit 117. In complex conjugate circuit 117, complex conjugates of the hard decision data are obtained, which are output to multiplier 107 and to multiplier 114.

According to the present embodiment, the output from RAKE combining circuit 105 is decoded instead of being recoded, and the output from RAKE combining circuit 105 is subjected to hard decision and output to complex conjugate circuit 117, and hence it is possible to increase the speed of procedure compared to a case where decoding and recoding are performed.

Incidentally, according to the present embodiment, data that is subject to hard decision can be the PL portion of DPCCH as well as data of the non-PL portion and such.

Embodiment 5

A case will be described here with the present embodiment where delay profiles are averaged by DPDCH alone, and delay profiles of DPDCH are subjected to in-phase addition after phase rotation correction, and iterative path search and channel estimation are performed.

Figure 7:
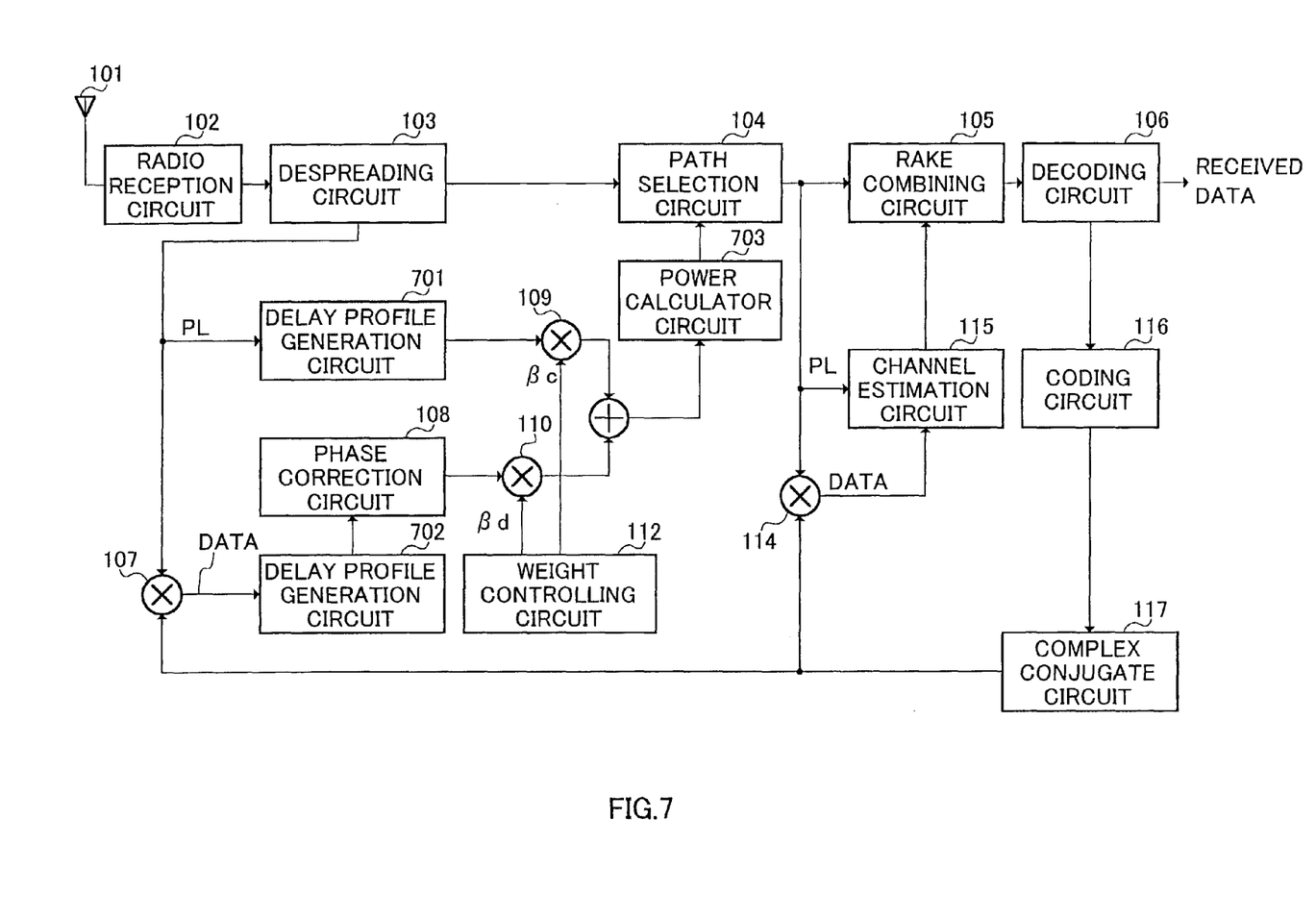
FIG. 7 is a block diagram showing a configuration of a wireless base station apparatus comprising a radio reception apparatus according to Embodiment 5 of the present invention.

FIG. 7 is a block diagram showing the configuration of a wireless base station apparatus comprising a radio reception apparatus according to Embodiment 5 of the present invention. Parts in FIG. 7 identical to those in above FIG. 1 are assigned the same codes as in FIG. 1 and their detailed explanations are omitted.

According to the wireless base station apparatus shown in FIG. 7, the despread signal obtained in despreading circuit 103 is output to path selection circuit 104 for path selection, m while the despread signal of the DPCCH (PL) portion is output to delay profile generation circuit 701 and the despread signal of the DPDCH (data) portion is output to multiplier 107.

In multiplier 107, the despread signal of the data portion is multiplied by a complex conjugate value of data in which decoded data is coded once again, and the result of multiplication is output to delay profile generation circuit 702 as a pseudo pilot signal.

Figure 8A:
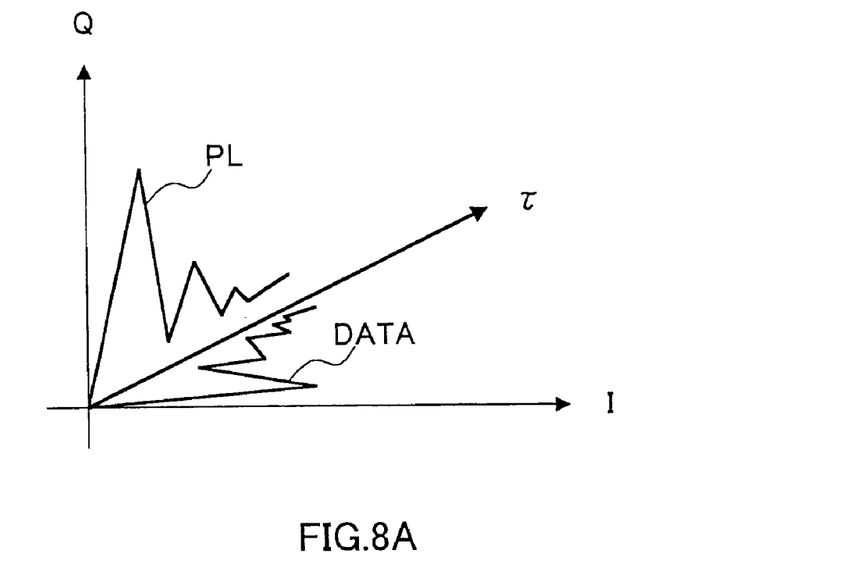
FIG. 8A describes delay profile generation according to Embodiment 5 of the present invention.

In delay profile generation circuit 701, delay profiles are generated using only DPCCH signals and averaged, and the averaged delay profile (the upper delay profile in FIG. 8A) is output to multiplier 109.

In delay profile generation circuit 702, delay profiles are generated using only DPDCH signals and averaged, and the averaged delay profile (the lower delay profile in FIG. 8A) is output to phase correction circuit 108. In phase correction circuit 108, the phase of the delay profile of the pseudo pilot signal is shifted by 90° and the delay profile after the shift is output to multiplier 110.

In multiplier 110, the shifted delay profile is multiplied by gain factor βd. The delay profile of the pseudo pilot signal thus multiplied by gain factor βd is output to adder 111. In multiplier 109, the delay profile of DPCCH is multiplied by gain factor βc. The delay profile multiplied by gain factor βc is output to adder 111. Incidentally, gain factors βc and βd are controlled in weight controlling circuit 112.

Figure 8B:
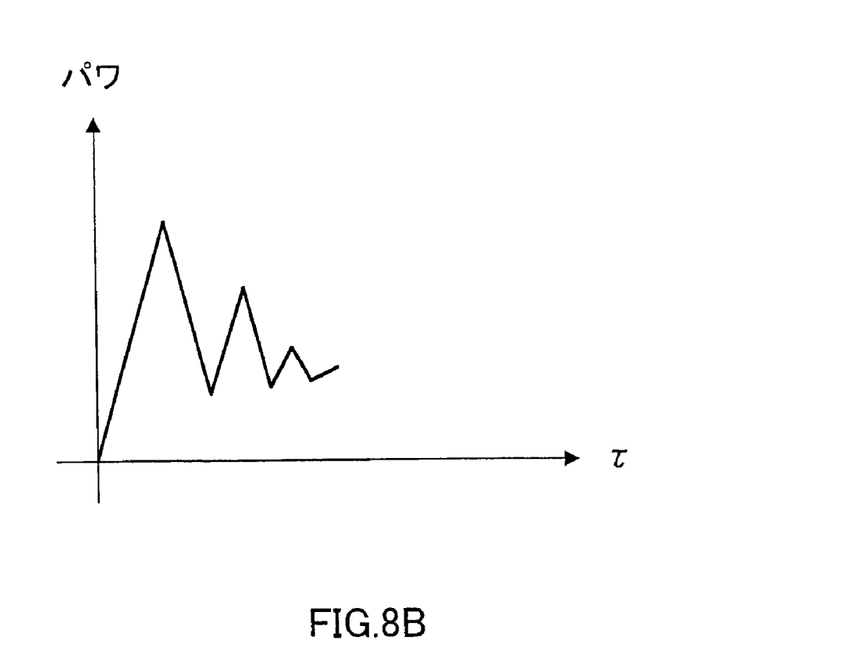
FIG. 8B describes delay profile generation according to Embodiment 5 of the present invention.

In adder 111, the delay profile of the pseudo PL signal output from multiplier 109 and the delay profile of DPCCH output from multiplier 110 are added, and the added delay profile after addition (that in which the delay profile of the pseudo PL signal and the delay profile of the PL signal are added together (FIG. 8B)) is output to power calculator circuit 703. In power calculator circuit 703, power ($I^2+Q^2$) is calculated from the added delay profile, and the calculation result (power delay profile) is output to path selection circuit 104. In path selection circuit 104, a given number of paths exceeding a given threshold level are selected from the power delay profile.

According to the present embodiment, delay profiles using DPCCH alone and delay profiles using DPDCH alone are subject to in-phase addition, and hence it is possible to reduce the amount of operation even though the memory volume increases compared to a case where despread signals are subject to in-phase addition.

Embodiment 6

Embodiment 1 through 5 described cases of (uplink channel signal) reception (wireless base station reception) where DPCCH and DPDCH were IQ-multiplexed; however, a case described here with the present embodiment (downlink channel signal) pertains to reception (communication terminal reception) where DPCCH and DPDCH are time-multiplexed.

Figure 9:
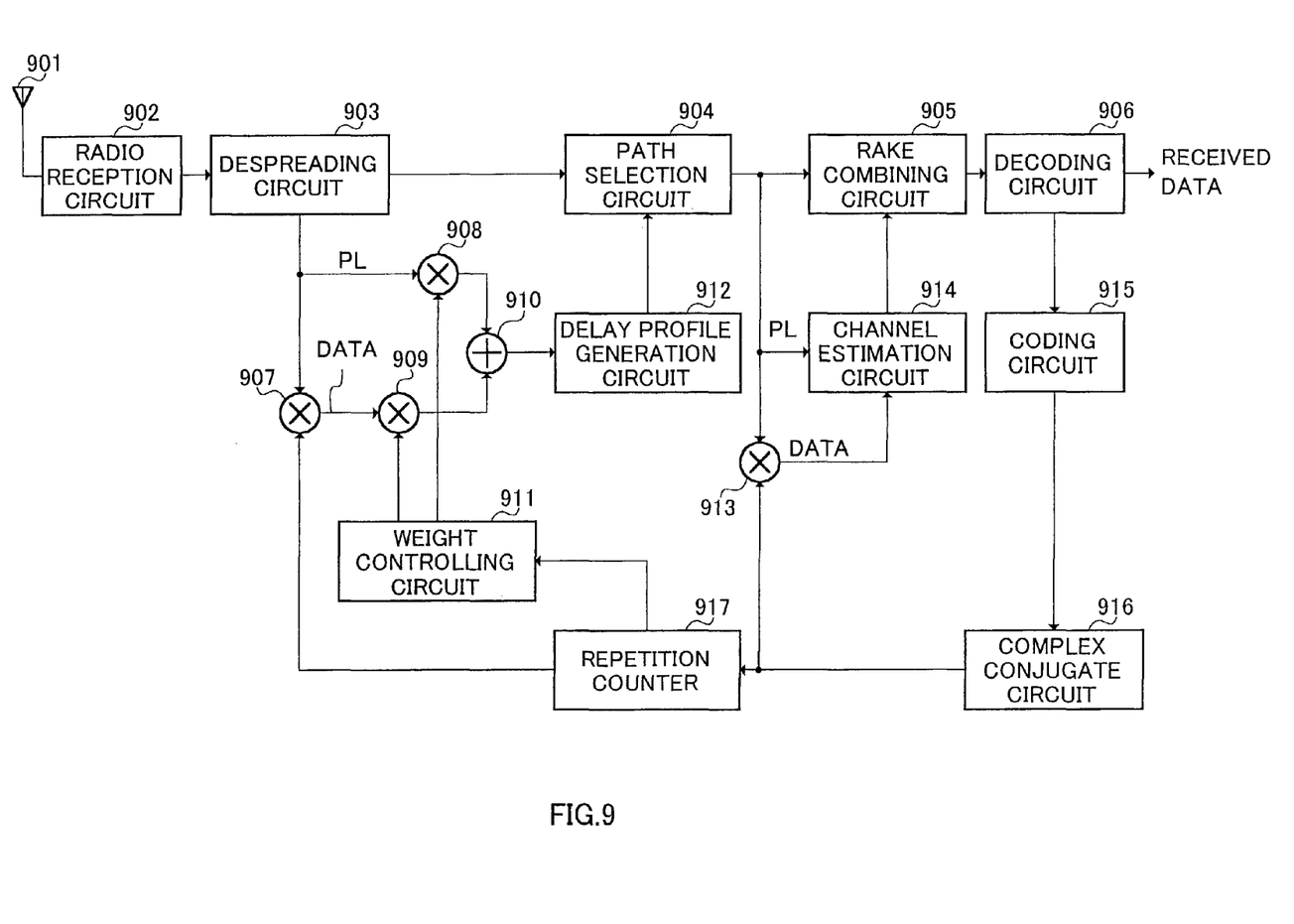
FIG. 9 is a block diagram showing a configuration of a communications terminal apparatus comprising a radio reception apparatus according to Embodiment 6 of the present invention.

FIG. 9 is a block diagram showing the configuration of a communications terminal apparatus comprising a radio reception apparatus according to Embodiment 6 of the present invention. The wireless base station apparatus in FIG. 9 shows the configuration of the receiving side alone; however, this communication terminal apparatus includes the configuration of the transmitting side as well.

A downlink channel signal from a wireless base station apparatus is received in radio reception circuit 902 by way of antenna 901. In radio reception circuit 902, the downlink channel signal is subjected to predetermined radio reception processing (e.g., down-conversion and A/D conversion), and the signal after radio reception processing is output to despreading circuit 903.

In despreading circuit 903, the signal after radio reception processing is subjected to despreading processing using the spreading code used by the wireless base station and output to path selection circuit 904 while also output to multiplier 907 and multiplier 908. That is, the despread signal is output to path selection circuit 904 for path selection. In addition, the despread signal of the pilot (PL) portion (known signal) of DPCCH is output to multiplier 908, while the despread signal of the DPDCH (data) portion is output to multiplier 907.

In multiplier 907, the despread signal of the data portion is multiplied by a complex conjugate value of data in which decoded data is coded once again, and the result of multiplication is output to multiplier 909 as a pseudo pilot signal.

In multiplier 909, the pseudo PL signal is multiplied by a weight coefficient controlled by weight controlling circuit 911, and the multiplication result is output to adder 910. In multiplier 908, the PL signal output from despreading circuit 903 is multiplied by a weight coefficient controlled by weight controlling circuit 911, and this multiplication result is output to adder 910. In adder 910, the pseudo PL signal multiplied by a weight coefficient and the PL signal multiplied by a weight coefficient are added, and the added PL signal after addition (that in which the pseudo PL signal and PL signal are added) is output to delay profile generation circuit 912.

In delay profile generation circuit 912, a delay profile is generated using the added PL signal. This delay profile is output to path selection circuit 904. In path selection circuit 904, a given number of paths (reception timings) exceeding a given threshold level are selected from the delay profiles. The despread signals of these selected reception timings are output to RAKE combining circuit 905. In RAKE combining circuit 905, channel estimation results output from channel estimation circuit 914 are used to RAKE-combine the selected paths, and the signal after combination is output to decoding circuit 906.

The despread signals of the reception timings selected in path selection circuit 904 are output also to channel estimation circuit 914. In multiplier 913, the despread signal of the data portion is multiplied by a complex conjugate value of data in which decoded data is coded once again, and the result of multiplication is output to channel estimation circuit 914 as a pseudo pilot signal. In channel estimation circuit 914, channel estimation is performed using the pseudo PL signal and PL signal, and this channel estimation result is output to RAKE combining circuit 905.

In decoding circuit 906, the signal after RAKE combining is decoded and output as received data, while also output to coding circuit 915. In coding circuit 915, the decoded data is recoded and then output to complex conjugate circuit 916. In complex conjugate circuit 916, complex conjugates of the recoded data are picked and output to multiplier 914 and repetition counter 917. In repetition counter 917, the number of output times from complex conjugate circuit 916 is counted, and the information of the repetition times is output to weight controlling circuit 911.

As to controlling the number of repetition times, it is also possible to use CRC (Cyclic Redundancy Check) information and, provided that CRC is OK, stop the repetition and counting the number of repetition times.

Next, the operation of a communication terminal comprising a radio reception apparatus having the above configuration will be described.

In a communication terminal, despreading processing is performed on the downlink channel signal to obtain the despread signal of the PL portion (PL portion of DPCCH) and the despread signal of the data portion (DPDCH). At the initial path search and channel estimation, a delay profile is generated in delay profile generation circuit 912 using the despread signal of the PL portion, and based on this delay profile, a reception timing for path is selected in path selection circuit 904 (path search).

Channel estimation is performed in channel estimation circuit 914 using the PL signals of the selected reception timings, and using these channel estimation results, despread signals of data portions are RAKE-combined in the RAKE combining circuit 905. The signal after combination is decoded in decoding circuit 906 to obtain received data, and meanwhile this decoded data is subjected to recoding in coding circuit 915 and then output to complex conjugate circuit 916. In complex conjugate circuit 916, complex conjugates of coded data are output to repetition counter 917 and multiplier 916 for iterative path search and channel estimation.

In multiplier 907, the despread signal of the data portion is multiplied by complex conjugates of the recoded data, whereby a pseudo PL signal is obtained. As described above, by multiplying complex conjugates of data, the orthogonal modulation elements of recoded data are removed, which makes possible the use of pseudo PL signals.

In a downlink channel signal, the PL portion (PL portion of DPCCH) and data portion (DPDCH) are multiplexed (time-multiplexed). That is, the PL portion (PL portion of DPCCH) and data portion (DPDCH) are multiplexed in such a way as to be transmitted at different timings.

In multiplier 908, the PL portion (PL portion of DPCCH) is multiplied by a weight coefficient controlled by weight controlling circuit 911, and in multiplier 909, the data portion (DPDCH) is multiplied by a weight coefficient controlled by weight controlling circuit 911. In weight controlling circuit 911, weight coefficients are controlled in accordance with the number of repetition times, which corresponds to outputs from repetition counter 917.

To be more specific, in weight controlling circuit 911, when the number of repetitions is small, based on the assumption that the reliability of the pseudo PL signal is low, the weight is reduced on the data side and increased on the PL side. On the other hand, when the number of repetitions is large, based on the assumption that the reliability of the pseudo PL signal is high, the weight on the data side is increased.

The pseudo signal and PL signal multiplied by weight coefficients are added in adder 910 and become an added PL signal. This added PL signal is output to delay profile generation circuit 912. In delay profile generation circuit 912, a delay profile is generated using the added PL signal.

The delay profile is output to path selection circuit 904 where path search is performed as described above, and the information of the selected reception timings are output to RAKE combining circuit 905 and channel estimation circuit 914.

In multiplier 907, the despread signal of the data portion is multiplied by complex conjugates of the recoded data, whereby a pseudo PL signal is obtained. As described above, by multiplying complex conjugates of data, the orthogonal modulation elements of recoded data are removed, which makes the use of pseudo PL signals possible.

In channel estimation circuit 914, channel estimation is performed using the pseudo PL signal and PL signal, and this channel estimation result is output to RAKE combining circuit 905. Processings in RAKE combining circuit 905, decoding circuit 906, coding circuit 915, and in complex conjugate circuit 916 are as described above. Then, complex conjugates from complex conjugate circuit 916 are output to multiplier 907 and multiplier 914. By thus performing iterative path search and iterative channel estimation, the accuracy of path search and channel estimation is heightened to enhance reception performance.

Thus according to the present embodiment, the weight of the pseudo PL signal is increased according to the number of repetition times, i.e., as the reliability of the pseudo PL signal becomes higher, so that iterative path search and channel estimation can be performed with high accuracy, and hence enhanced reception performance. Furthermore, time-multiplexed DPCCH signals and DPDCH signals are subjected to in-phase addition after assigned weight, so that the number of samples per time unit increases, which makes it possible to average delay profiles in a shorter time period. Moreover, it is possible to improve the SN ratio (Signal to Noise Ratio) after in-phase addition and perform iterative path search more accurately.

A case was described above with the present embodiment where iterative path search and channel estimation are performed using time-multiplexed data portion and PL portion; nevertheless, according to the present embodiment, it is still possible to perform iterative path search and channel estimation using downlink common pilot signals multiplexed with channels for transmitting time-multiplexed data and PL. In such case, the transmission power of downlink common pilot signals differs from that of channels for transmitting time-multiplexed data and PL, and so, in addition to the number of repetition times, the transmission power ratio between both is taken into consideration to control weight coefficients as in Embodiment 1 through 5.

The present invention is not limited to Embodiment 1 through 6 and can be implemented in various other forms. For example, Embodiments 1 to 6 can be combined in various ways and implemented.

According to above Embodiments 1 to 5, the DPDCH side is subjected to phase rotation correction and thereafter to in-phase addition; however, the present invention is still applicable to cases where DPCCH is subjected to phase rotation correction and thereafter to in-phase addition.

With respect to gain factors $\beta c$ and $\beta d$, the transmission side and the reception side do not have to use identical values as long as the ratio between gain factors $\beta c$ and $\beta d$ is maintained.

As described above, according to the radio reception apparatus and radio reception method of the present invention, it is possible to assign weight to pseudo known signals composed of known signals and data signals according to signal quality and subject them to in-phase addition, and consequently it is possible to improve signal quality after in-phase addition and perform iterative path search with high accuracy.

The present specification is based on Japanese Patent Application No. 2001-095153 filed on Mar. 29, 2001, entire content of which is expressly incorporated herein for reference.

INDUSTRIAL APPLICABILITY

The present invention suits for use with a radio reception apparatus and radio reception method used in a digital wireless communication system.

The invention claimed is:

1. A radio reception apparatus comprising:
   a coding section that codes data where a data portion in a received signal, containing a known signal portion and said data portion, has been decoded;
   a weighting section that assigns weight to a pseudo known signal, generated using the coded data and the known signal, according to reception quality;
   an in-phase addition section that performs in-phase addition of said pseudo known signal and said known signal; and
   a path search section that repeats path search using signals that have been subjected to in-phase addition, wherein:
   said weighting section assigns greater weight to said pseudo known signal and assigns smaller weight to said known signal in accordance with an increase of the number of times path search is repeated.

2. The radio reception apparatus according to claim 1, wherein said weighting section assigns weight to said known signal and said pseudo known signal according to a threshold determination result between reception quality and a predetermined threshold.

3. The radio reception apparatus according to claim 1, wherein said weighting section assigns greater weight to said pseudo known signal in accordance with an increase of reception quality.

4. The radio reception apparatus according to claim 1, further comprising a channel estimation section that, based on a reception timing obtained through path search, performs channel estimation using said pseudo known signal and said known signal.

5. The radio reception apparatus according to claim 1, wherein said weighting section controls weighting according to a ratio between a transmission power of the known signal portion and a transmission power of the data portion.

6. The radio reception apparatus according to claim 1, further comprising a phase correction section that corrects a phase of said known signal portion or a phase of said data portion to give said known signal portion and said data portion the same phase.

7. A wireless base station apparatus comprising the radio reception apparatus of claim 1.

8. A communication terminal apparatus comprising the radio reception apparatus of claim 1.

9. A radio reception apparatus comprising:
a hard decision section that performs hard decision of a data portion in a received signal containing a known signal portion and said data portion;
a weighting section that assigns weight to a pseudo known signal generated using the hard-decided data and the known signal according to reception quality;
an in-phase addition section that performs in-phase addition of said pseudo known signal and said known signal; and
a path search section that repeats path search using signals that have been subjected to in-phase addition, wherein:
said weighting section assigns greater weight to said pseudo known signal and assigns smaller weight to said known signal in accordance with an increase of the number of times path search is repeated.

10. The radio reception apparatus according to claim 9, wherein said weighting section assigns weight to said known signal and said pseudo known signal according to a threshold determination result between reception quality and a predetermined threshold.

11. The radio reception apparatus according to claim 9, wherein said weighting section assigns greater weight to said pseudo known signal in accordance with an increase of reception quality.

12. A radio reception method, comprising:
coding data where a data portion in a received signal, containing a known signal portion and said data portion, has been decoded;
assigning weight to a pseudo known signal, generated using the coded data and the known signal, according to reception quality;
performing in-phase addition of said pseudo known signal and said known signal; and
repeating path search using signals that have been subjected to in-phase addition, wherein:
the weighting operation assigns greater weight to said pseudo known signal and assigns smaller weight to said known signal in accordance with an increase of the number of times path search is repeated.

13. The radio reception method according to claim 12, wherein said the weighting operation assigns greater weight to said pseudo known signal in accordance with an increase of reception quality.

14. A radio reception method, comprising:
performing hard decision of a data portion in a received signal containing a known signal portion and said data portion;
assigning weight to a pseudo known signal, generated using the hard-decided data, and the known signal according to reception quality;
performing in-phase addition of said pseudo known signal and said known signal; and
repeating path search using signals that have been subjected to in-phase addition, wherein
the weighting operation assigns greater weight to said pseudo known signal and assigns smaller weight to said known signal in accordance with an increase of the number of times oath search is repeated.

15. The radio reception method according to claim 14, wherein the weighting operation assigns greater weight to said pseudo known signal in accordance with reception quality.

* * * * *